US012709070B2

(12) United States Patent
Elder et al.

(10) Patent No.: US 12,709,070 B2
(45) Date of Patent: Aug. 18, 2026

(54) INDUCTION BONDED REEL

(71) Applicant: Vandor Corporation, Richmond, IN (US)

(72) Inventors: Jack E. Elder, Rochester, MI (US); Richard Brown, Richmond, IN (US); Christopher Nichols, Englewood, OH (US)

(73) Assignee: Vandor Corporation, Richmond, IN (US)

(*) Notice: Subject to any disclaimer, the term of this patent is extended or adjusted under 35 U.S.C. 154(b) by 90 days.

(21) Appl. No.: 18/671,567

(22) Filed: May 22, 2024

(65) Prior Publication Data

US 2024/0391180 A1 Nov. 28, 2024

Related U.S. Application Data

(60) Provisional application No. 63/503,782, filed on May 23, 2023.

(51) Int. Cl.
*B65H 75/14* (2006.01)
*B29C 65/36* (2006.01)
*B29L 31/00* (2006.01)

(52) U.S. Cl.
CPC ........ *B29C 65/364* (2013.01); *B29C 65/3676* (2013.01); *B65H 75/14* (2013.01); *B29L 2031/704* (2013.01)

(58) Field of Classification Search
CPC ............... B29C 65/364; B29C 65/3676; B29L 2031/704; B65H 75/12; B65H 75/14
USPC ..... 242/118.7; 264/402, 403, 405, 431, 486, 264/487
See application file for complete search history.

(56) References Cited

U.S. PATENT DOCUMENTS 3,232,550 A 2/1966 Cuva
4,832,281 A 5/1989 Payne et al.
5,464,171 A * 11/1995 Ripplinger ........ B29C 66/12821 242/118.61
6,036,138 A 3/2000 Sexton et al.
7,534,316 B2 * 5/2009 Ripplinger ........ B29C 66/73116 156/293
7,753,596 B2 7/2010 Cox
7,789,214 B2 9/2010 Bergeron et al.
7,984,738 B2 * 7/2011 LaMarca ................ B29C 70/88 524/439

(Continued)

FOREIGN PATENT DOCUMENTS

DE 3106165 A1 12/1981

OTHER PUBLICATIONS

PCT Search Report and Written Opinion corresponding to International Application No. PCT/US2024/30565 dated Oct. 30, 2024. (17 Pages).

(Continued)

*Primary Examiner* — Joshua E Rodden
(74) *Attorney, Agent, or Firm* — Maginot, Moore & Beck LLP

(57) ABSTRACT

A reel includes a core, a first flange affixed to a first end of the core, a second flange affixed to a second opposite end of the core, and a first bonded joint connecting the first flange to the core. The first bonded joint includes a first susceptor material arranged between the first flange and the first end of the core, and the first flange and the first end of the core are bonded around the first susceptor material.

18 Claims, 12 Drawing Sheets

(56) References Cited

U.S. PATENT DOCUMENTS

| | | | | |
|---|---|---|---|---|
| 8,007,671 | B2 | 8/2011 | Chen et al. | |
| 8,015,635 | B1 * | 9/2011 | Miga | B62D 33/0612 5/8 |
| 8,177,967 | B2 | 5/2012 | Bagci et al. | |
| 8,216,416 | B2 | 7/2012 | Allison et al. | |
| 8,424,924 | B2 | 4/2013 | LaMarca et al. | |
| 8,425,961 | B2 | 4/2013 | Turek | |
| 8,444,863 | B2 | 5/2013 | Chen et al. | |
| 8,491,764 | B2 * | 7/2013 | Wu | C25B 9/19 204/276 |
| 8,616,360 | B2 | 12/2013 | Bergeron et al. | |
| 9,750,390 | B2 | 9/2017 | Flores et al. | |
| 9,840,040 | B2 | 12/2017 | Moore, Jr. et al. | |
| 9,850,647 | B1 | 12/2017 | Coppes et al. | |
| 9,854,942 | B2 | 1/2018 | Crocker et al. | |
| 10,087,038 | B2 | 10/2018 | Mori | |
| 10,213,088 | B2 | 2/2019 | Flores et al. | |
| 10,421,236 | B1 | 9/2019 | Moore, Jr. et al. | |
| 10,427,356 | B1 | 10/2019 | Holbrook et al. | |
| 10,513,830 | B2 | 12/2019 | Coppes et al. | |
| 10,696,448 | B1 | 6/2020 | Holbrook et al. | |
| 10,723,080 | B1 * | 7/2020 | Holbrook | B29C 65/56 |
| 10,919,728 | B2 * | 2/2021 | Wlasak | B29C 65/20 |
| 11,241,117 | B2 | 2/2022 | Crocker et al. | |
| 12,179,155 | B2 | 12/2024 | Rautio et al. | |
| 12,226,052 | B2 | 2/2025 | Crocker et al. | |
| 2005/0001087 | A1 * | 1/2005 | Ridgeway | B65H 75/14 242/608.8 |
| 2005/0077423 | A1 | 4/2005 | Cox et al. | |
| 2005/0284559 | A1 | 12/2005 | Ripplinger et al. | |
| 2007/0176044 | A1 * | 8/2007 | Sogabe | G11B 23/037 242/608.8 |
| 2010/0084089 | A1 * | 4/2010 | Wheaton | B29C 66/1142 156/273.9 |
| 2012/0104147 | A1 * | 5/2012 | Cox | B65H 75/14 242/614 |
| 2016/0151965 | A1 * | 6/2016 | Carlsten | F16B 11/008 156/275.7 |
| 2016/0355371 | A1 | 12/2016 | Baranov et al. | |
| 2019/0358909 | A1 * | 11/2019 | Murillo | B29C 66/131 |
| 2022/0089403 | A1 * | 3/2022 | Echols, Jr. | B29C 43/14 |
| 2022/0098002 | A1 | 3/2022 | Kisselstein et al. | |
| 2024/0417210 | A1 * | 12/2024 | Brown | B29C 66/522 |

OTHER PUBLICATIONS

PCT Search Report and Written Opinion corresponding to International Application No. PCT/US2024/33345 dated Oct. 11, 2024. (14 Pages).

Machine English Translation of DE3106165A1. (17 Pages).

* cited by examiner

420

INDUCTION BONDED REEL

CROSS-REFERENCE TO RELATED APPLICATION

This application claims priority to U.S. Provisional Application Ser. No. 63/503,782 entitled "Ferrous Induction Bonded Reel" filed May 23, 2023, the disclosure of which is incorporated herein by reference in its entirety.

FIELD

This disclosure relates generally to apparatus for supporting wound flexible media, for example, cord, cable, fiber or wire.

BACKGROUND

The transport and use of cable, wire, optical fiber, and other wound media typically involves winding the flexible media on a spool or reel. Typical reels for construction purposes can have a traverse length (or axial height) of any length, and any flange diameter. Reels generally consist of a core around which the wound media is wrapped, and two flanges at opposite ends of the core. Such reels can be made of wood, but are often constructed of plastic and/or corrugated paper to obtain better strength-to-weight ratios. Reels further more often include steel bolts, staples, or other connectors. Such reels have many good features, but can present difficulties in recycling due to the use of different materials. Recycling used reels is a feature that can lead to reduced landfills, and overall environmental improvements.

There is a need, therefore, for a reel design that facilitates recycling while maintaining sufficient structural integrity for normal use.

SUMMARY

The disclosure provides a design that provides a strong ferrous bonded material connection between the flange and the core. The ferrous bonded connection simplifies manufacturing of the reel and provides an economical solution for bonding the flanges to the core.

In one embodiment according to the disclosure, a reel includes a core, a first flange affixed to a first end of the core, a second flange affixed to a second opposite end of the core, and a first bonded joint connecting the first flange to the core. The first bonded joint includes a first susceptor material arranged between the first flange and the first end of the core, and the first flange and the first end of the core are bonded around the first susceptor material.

In another embodiment, the first flange comprises a core nest region defining an annular channel in which the first end of the core is connected to the first flange via the first bonding joint.

In a further embodiment, the first bonded joint further comprises a resin material in which the first susceptor material is embedded, and the resin material is materially bonded to a first material of the core and to a second material of the first flange.

In some embodiments of the reel, the first susceptor material is arranged at least partially between a base of the annular channel and the first end of the core.

In an embodiment, the first susceptor material is partially interposed between an inner wall of the annular channel and an inner radial surface of the core.

In another embodiment, a first distance between an outer wall of the annular channel and an outer radial surface of the core is less than a second distance between an inner wall of the annular channel and an inner radial surface of the core.

The first susceptor material may further comprise a first portion arranged between an end surface of the core and a base surface of the annular channel, a second portion interposed between an inner side surface of the core and an inner wall of the annular channel, and a third portion interposed between the inner side surface of the core and the inner wall of the annular channel. The second portion is interposed axially between the first and third portions and the second portion has a smaller radial thickness than the third portion.

In some embodiments, the first flange further comprises a plurality of wedge-shaped portions protruding outwardly from an inner wall of the annular channel, the wedge-shaped portions configured to urge the first end of the core radially outwardly toward an outer wall of the annular channel.

In an embodiment of the reel, a first material of the core is materially bonded to a second material of the first flange at the first susceptor material.

The first susceptor material may include at least one wire arranged in the annular channel and around which the first flange and the first end of the core are bonded to one another, and/or the first susceptor material may include a wire mesh arranged in the annular channel and around which the first flange and the first end of the core are bonded to one another.

The first flange may define a plurality of notches extending radially from the annular channel and in which the first susceptor material is partially arranged.

In one embodiment, the first flange includes a plurality of wedge-shaped cutouts defined into an inner wall of the annular channel, and the first susceptor material is arranged partially in the plurality of wedge-shaped cutouts.

Some embodiments of the reel further comprise a second bonded joint connecting the second flange to the second end of the core, the second bonded joint including a second susceptor arranged between the second flange and the second end of the core. The second flange and the second end of the core are bonded around the second susceptor material.

The disclosure also includes a method of producing a reel comprising interposing a first susceptor material between a first flange and a first end of a core of the reel, and applying a magnetic field to the first susceptor material so as to excite the first susceptor material and increase a temperature of the first susceptor material, forming a first bonded joint around the first susceptor at which the first flange is bonded to the first end of the core.

In the method, the interposing of the first susceptor material may include inserting the first susceptor material and the first end of the core in an annular channel defined in the first flange.

In another embodiment, the method comprises applying pressure urging the core and the first flange together while applying the magnetic field.

In yet another embodiment, the method includes interposing a second susceptor material between the second flange and a second opposite end of the core and applying the magnetic field to the second susceptor material so as to excite the second susceptor material and increase a temperature of the second susceptor material forming a second bonded joint around the second susceptor material at which the second flange is bonded to the second end of the core.

In one embodiment, the applying of the magnetic field to the first susceptor material and the applying of the magnetic field to the second susceptor material occur at least partially simultaneously.

Further, the method may also include applying axial pressure to the first and second flanges during the application of the magnetic field to the first and second susceptor materials to urge the first and second flanges toward one another.

DETAILED DESCRIPTION

Figure 1:
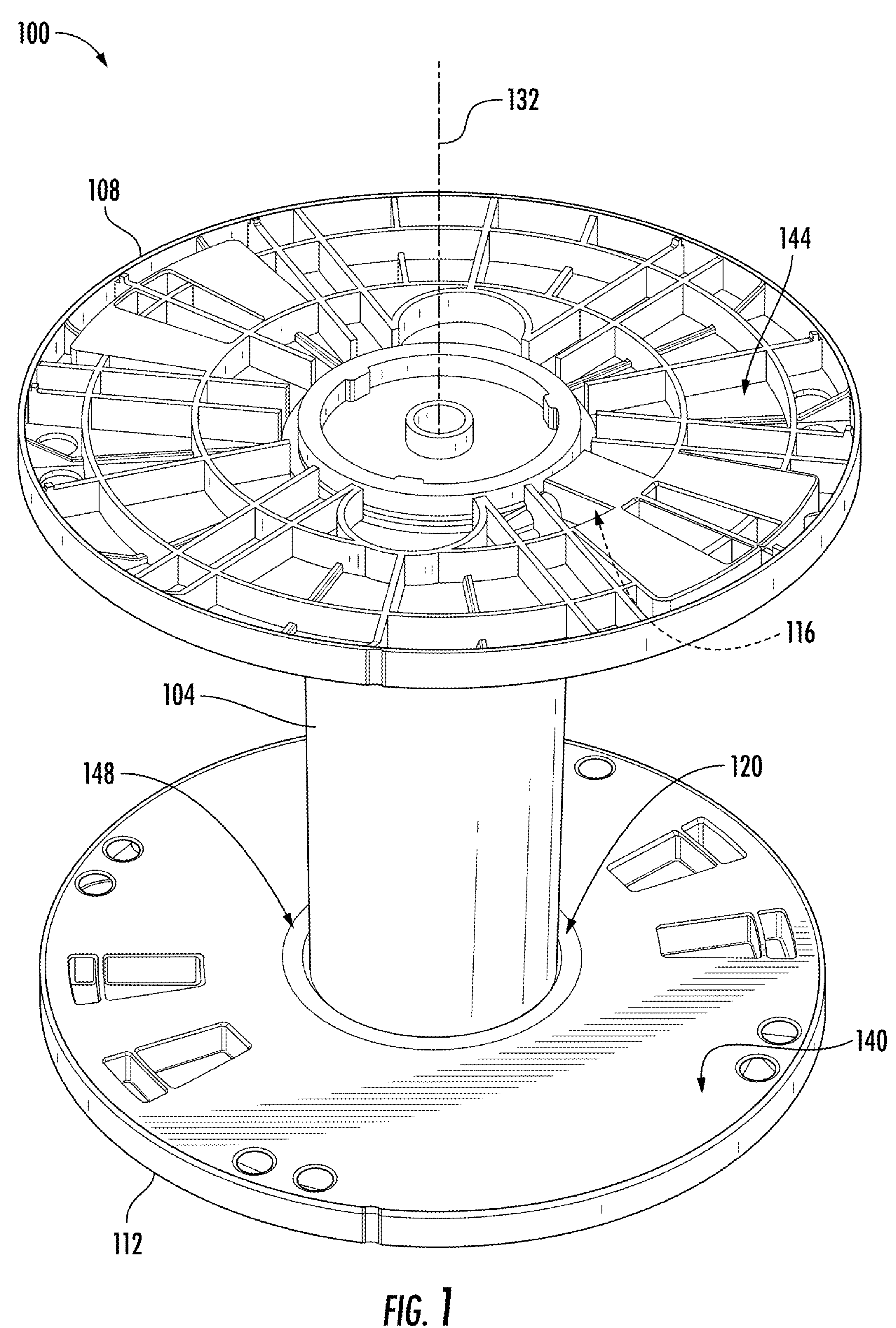
FIG. 1 depicts a front perspective view of a reel for receiving wound media according to the disclosure.
Figure 2:
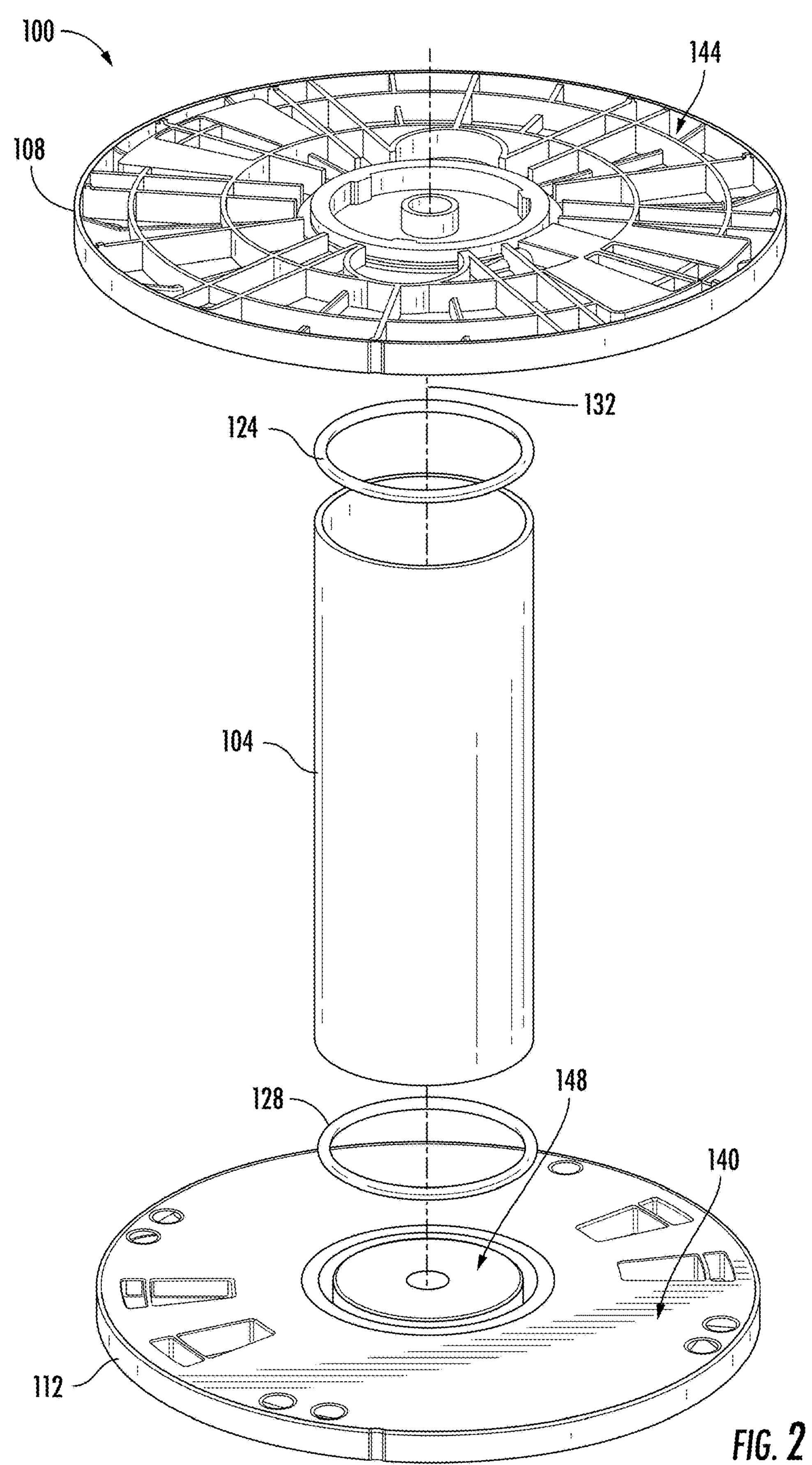
FIG. 2 depicts the reel of FIG. 1 in an exploded view.

FIG. 1 shows a perspective view of an exemplary embodiment of a reel 100 according to the disclosure, and FIG. 2 shows an exploded perspective view of the reel 100 of FIG. 1. With reference to FIGS. 1 and 2, the reel 100 includes a core 104, a first flange 108, a second flange 112, a first bonded joint 116, and a second bonded joint 120. The bonded joints 116, 120 are formed by a respective bonding material 124, 128 that is materially bonded, e.g. fused, to both the core 104 and the associated flange 108, 112. The reel is configured such that flexible media, which can include cable, wire, fiber optical cable, rope, string, etc., can be wound around the core 104 and axially retained on the core by the flanges 108, 112.

The flanges 108, 112, and the bonded joints 116, 120 are substantially identical at each end of the core 104. The following disclosure therefore only describes one of the flanges 108 and bonded joints 116, though the reader should appreciate that the flange 112 and bonded joint 120 at the opposite end of the core 104 may be substantially identical.

The core 104 is formed as a hollow cylindrical body that defines a central axis 132 of the reel 100. The core 104 is formed of plastic, which may be, for example, polypropylene plastic. In other embodiments, the core 104 is formed of polyethylene, polycarbonate, ABS, polystyrene, nylon, a combination of two or more of the aforementioned materials, or another desired material.

The flanges 108, 112 are generally disk-shaped, with an inner side 140 (i.e. the side facing toward the opposite flange) being substantially flat and an outer side 144 including a plurality of radially and circumferentially extending structural ribs. Each of the flanges 108, 112 has a core nest region 148 located in the centrally in the flange 108, 112 and in which the flange 108, 112 is bonded to the core 104 at the respective bonded joint 116, 120.

The flanges 108, 112 are formed of plastic such as, for example, polypropylene plastic. Alternatively, in some embodiments, the flanges 108, 112 are formed of polyethylene, polycarbonate, ABS, polystyrene, nylon, a combination of one or more of the aforementioned materials, or another desired material. The flanges 108, 112 may, in particular, be formed of the same plastic material as the core 104. In some other embodiments, however, the flanges 108, 112 and the core 104 may be formed of a different plastic material.

Figure 3:
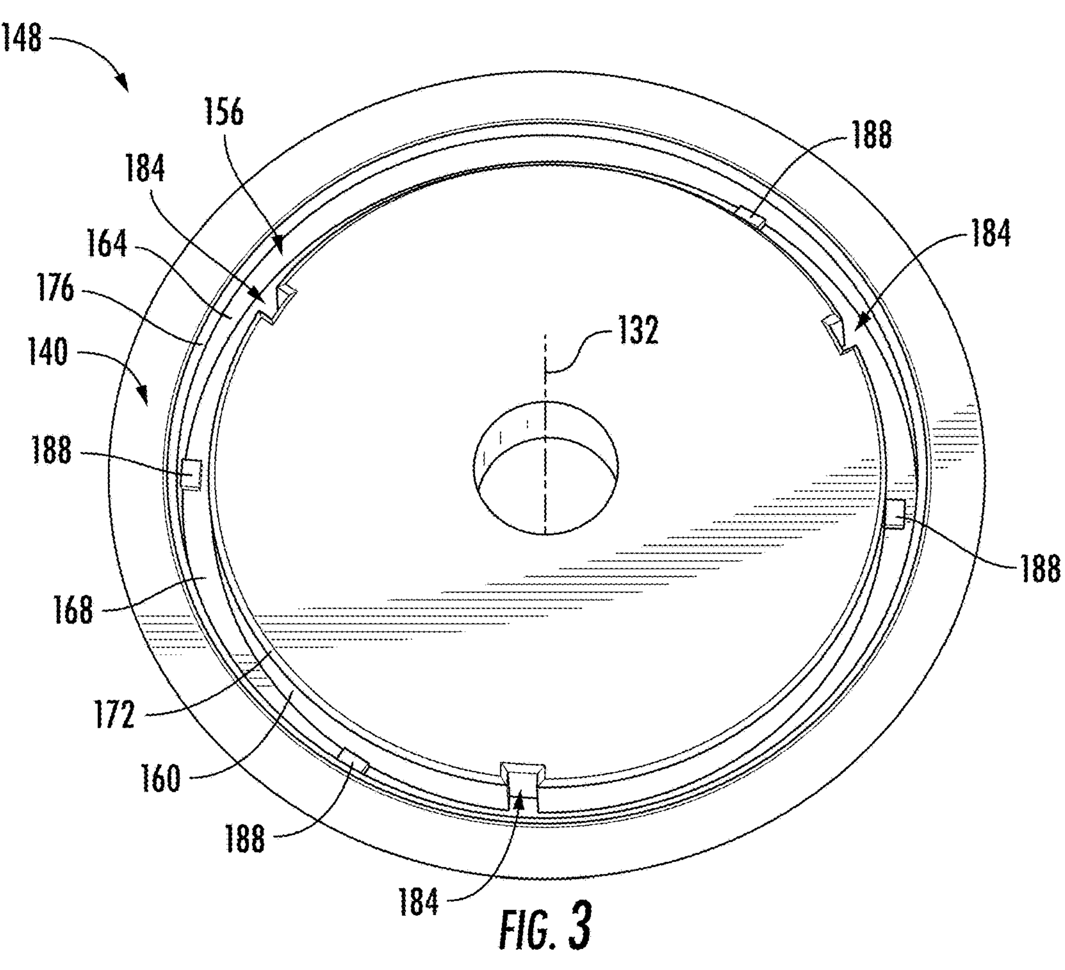
FIG. 3 illustrates a top perspective view of a core nest region of a flange of the reel of FIG. 1.
Figure 6:
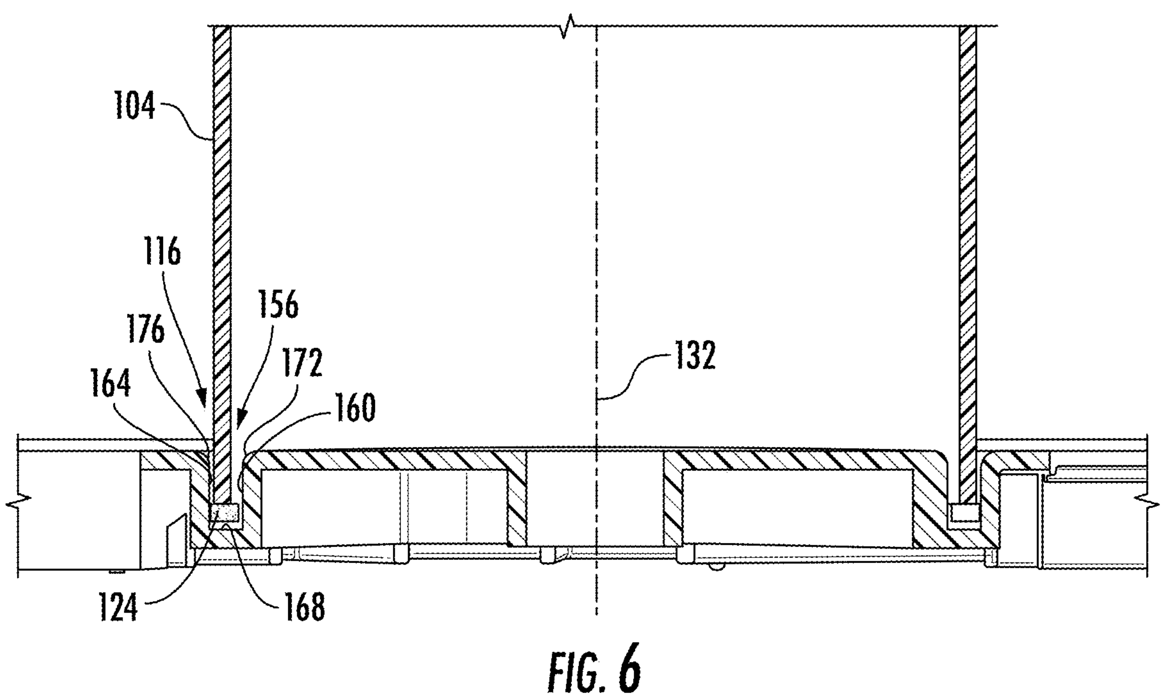
FIG. 6 is a side cross-sectional view of the core and the core nest region of the flange of the reel of FIG. 1 prior to application of a magnetic field to the bonding material.
Figure 7:
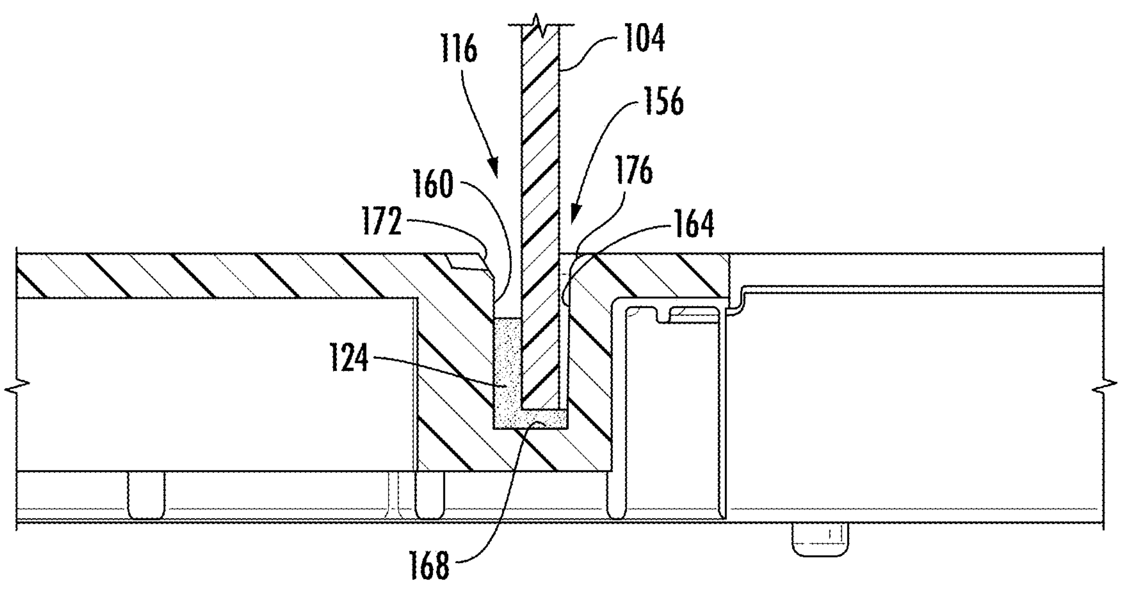
FIG. 7 is a detail side cross-sectional view of the annular channel and the end of the flange of the reel of FIG. 1 after application of the magnetic field to the bonding material.

With particular reference now to FIGS. 3, 6, and 7, the inner side 140 of the core nest region 148 defines a generally annular channel 156 centered at the central axis 132. The annular channel has substantially the same diameter as the core 104, and is formed by a generally circular inner wall 160, a generally circular outer wall 164, and a base surface 168.

The inner and outer walls 160, 164 are each slightly angled relative to the central axis 132 such that the base of the channel 156 has a lesser width than the upper portions of the channel 156. The angles of the inner and outer walls 160, 164 may be, for example, between 0.5 degrees and 3 degrees. In one particular embodiment, the angles formed by the inner and outer walls 160, 164 relative to the central axis 132 are approximately 1 degree. Additionally, at the open end of the channel 156, each of the inner and outer walls 160, 164 includes a chamfer 172, 176, which may be formed as a rounded edge 176 or a flat edge 172. As will be discussed in detail below, the angles of the inner and outer walls 160, 164, as well as the chamfered edges 172, 176, facilitate assembly of the core 104 into the annular channel 156.

Referring now to FIG. 3, the inner wall 160 of the annular channel 156 defines a plurality of inwardly-extending locating notches 184. In the illustrated embodiment, there are three locating notches 184, though the reader should appreciate that other embodiments may include any desired number of locating notches 184. In addition, while the locating notches 184 are defined in the inner wall 160 in the illustrated embodiment, the reader should appreciate that in other embodiments the locating notches 184 may be defined in the outer wall 164 or in a combination of the inner and outer walls 160, 164.

In addition, a plurality of stand-off tabs 188 extend upwardly from the base surface 168 and into the channel 156 from the inner and outer walls 160, 164. Each of the stand-off tabs 188 extends upwardly from the base surface 168 by a distance of between 0.02 and 0.1 inches. In one particular embodiment, the stand-off tabs 188 extend upwardly from the base surface 168 by a distance of approximately 0.050 inches. In the illustrated embodiment, the channel 156 includes six stand-off tabs (only four of which are visible in FIG. 3) spaced evenly around the circumference of the channel 156 and alternating between extending inwardly from the outer wall 164 and outwardly from the inner wall 160. The reader should appreciate, however, that a different number of stand-off tabs and/or a different configuration of stand-off tabs may be used in other embodiments.

Figure 4:
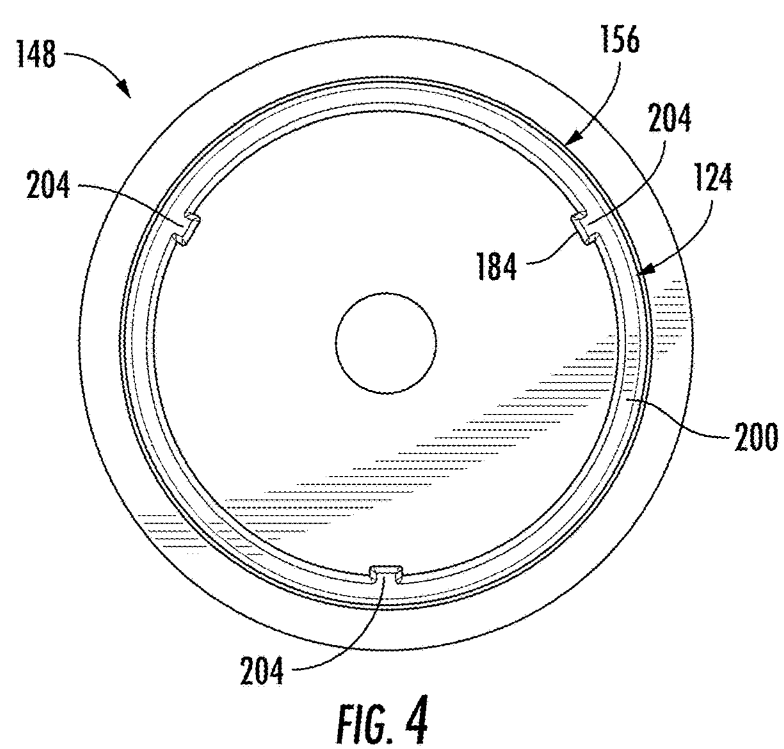
FIG. 4 illustrates a top view of the core nest region of the flange of FIG. 3 with a ring of bonding material arranged in an annular channel.
Figure 5:
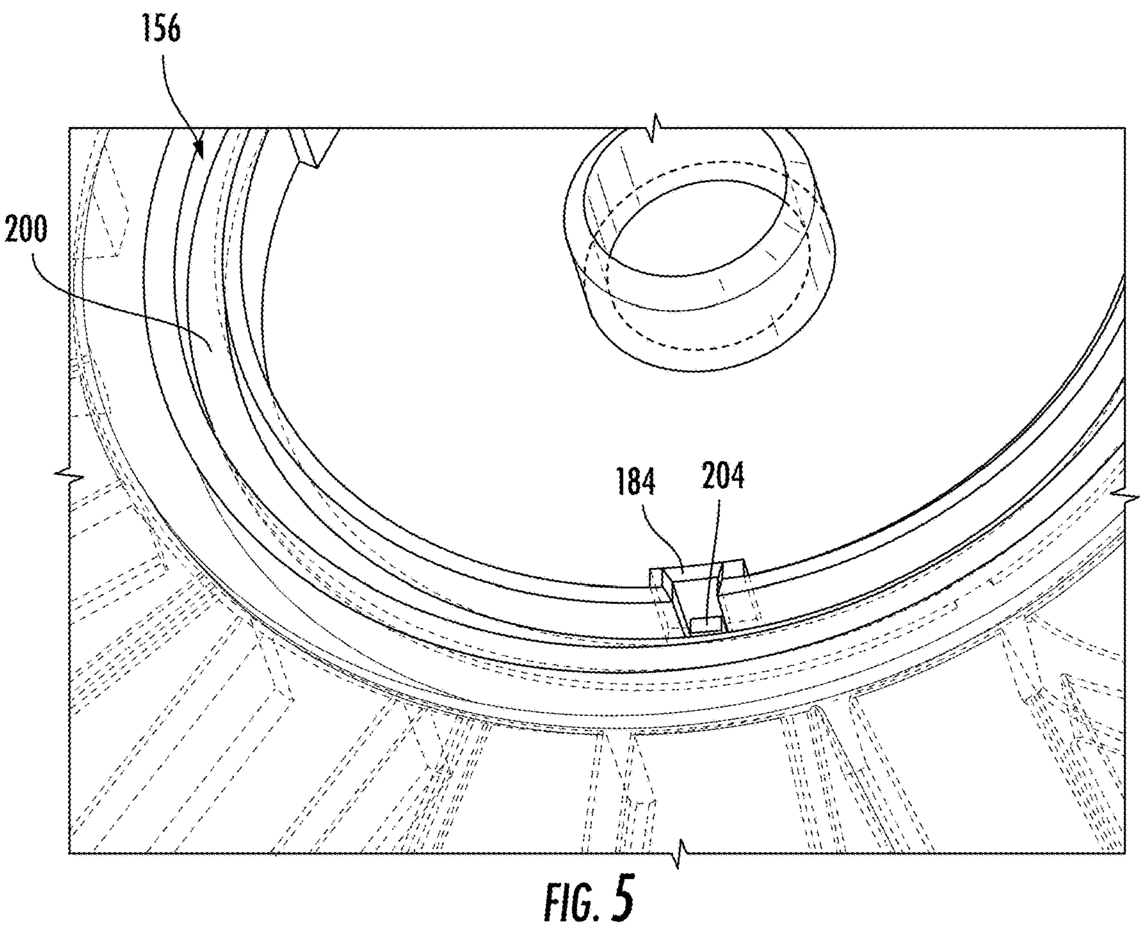
FIG. 5 depicts a top perspective view of a portion of the core nest region of FIG. 3, with the flange shown as partially transparent to show the features inside the annular channel.

FIGS. 4 and 5 illustrate the first bonding material 124 arranged in the annular channel 156 of the flange 108 (which, for clarity, is shown as partially transparent in FIG. 5) prior to the bonding process. In the illustrated embodiment, the bonding material 124 is formed as a ring 200 having a plurality of inwardly-extending protrusions 204 that correspond to the locating notches 184 of the annular channel 156. Thus, the reader should appreciate that the number and shape of the protrusions 204 may vary depending on the configuration of the locating notches 184. As seen in FIG. 6, the ring 200 of bonding material 124 has a generally rectangular cross-sectional shape before the bonding process. However, the shape of the ring 200 may be different in other embodiments as desired to direct the bonding material to particular locations in the bonded joint 116. In addition, in some embodiments, the bonding material 124 is configured to form a radial interference fit in the annular channel 156. As a result, the bonding material 124 exerts outward radial force on the walls 160, 164 of the channel 156 to further facilitate the bonding between the bonding material 124 and the walls 160, 164.

Figure 4A:
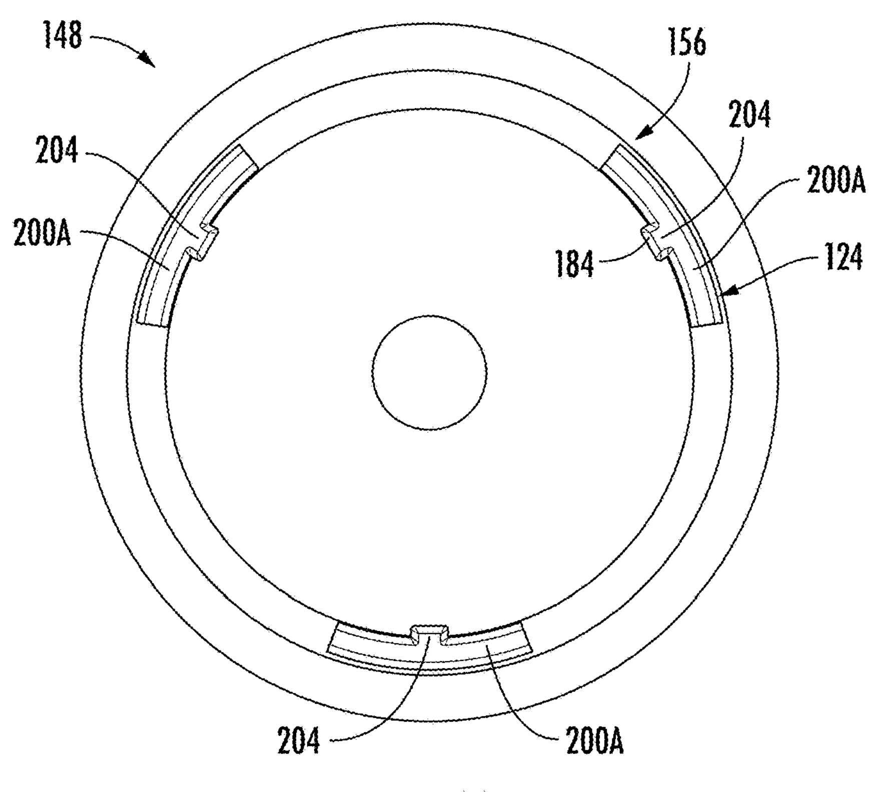
FIG. 4A illustrates a top view of the core nest region of the flange of FIG. 3 with multiple ring portions of bonding material arranged in the annular channel.

In some embodiments, the bonding material 124 may be formed as an incomplete ring, for example as a ring segment that includes a gap, or as a plurality of ring segments 200A (FIG. 4A) defining a plurality of gaps 202 between the respective ring segments. In particular, using a bonding material 124 formed as one or more ring segments allows for certain regions of the circumference of the channel 156 to be isolated from the bonding material 124, enabling other design features, such as for example a radial offset hole, to be present in these areas. Additionally, the quantity of bonding material 124 used can be reduced in embodiments in which bonding is not necessary around the entirety of the annular channel 156, thereby reducing the overall manufacturing cost of the reel 100.

The bonding material 124 is formed of a resin, i.e. plastic, impregnated with ferrous susceptor material. More specifically, the plastic of the bonding material 124 is compatible with the plastics of both the core 104, specifically the end regions thereof if the core 104 is formed of more than one material, and the flanges 108, 112, specifically the annular channel 156 of the flanges 108, 112 if the flanges 108, 112 are formed of more than one material. In one embodiment, the bonding material 124 is a polypropylene plastic impregnated with a susceptor material such as metal powder or metal flakes, more particularly iron powder or iron flakes. In other embodiments, the bonding material 124 may be polyethylene, polycarbonate, ABS, polystyrene, nylon, or another desired material.

In one embodiment, the ring 200 or ring segments 200A of the bonding material 124 may be formed by injection molding, which enables the bonding material 124 to be sized and shaped to allow for an optimized bond between the core 104 and the flange 108. Alternatively, in some embodiments, the bonding material 124 may be extruded directly into the annular channel 156 by, for example, a 3D printer or similar arrangement, or it may be formed as a cord that can be arranged in the annular channel 156.

The bonding material 124 is configured such that application of a magnetic field to the bonding material 124 excites the ferrous susceptor material impregnated in the plastic. As a result, the susceptor material generates heat, which increases the temperature of the plastic in the bonding material 124. This causes the plastic in the bonding material 124 to liquefy and fill the volume between the end of the core 104 and the annular channel 156. Constant pressure applied to the core 104 and/or flange 108 in the direction toward one another causes the end of the core 104 to displace the liquefied plastic of the bonding material 124 so that the end surface of the core 104 settles on the stand-off tabs 188, while the bonding material 124 moves along at least one of the side walls of the core 104 in the direction toward the opening of the channel 156.

In one particular embodiment, the core 104 is arranged closer to the outside of the annular channel 156 or, in other words, the distance from the outer diameter of the core 104 to the outer wall 164 is less than the distance from the inner diameter of the core 104 to the inner wall 160. When the constant pressure is applied to press the core 104 and flange 108 together, the melted bonding material 124 flows along the inner wall 160 of the channel 156 due to the larger gap along the inner wall 160, while largely remaining near the base of the outer wall 164 due to the smaller gap between the outer wall 164 and the core 104. Moreover, the stand-off tabs 188 limit the travel of the core 104 relative to the flange 108 during the pressure, thereby limiting the flow of the bonding material out of the channel 156. As a result, any excess bonding material 124 remains on the inside of the core 104 such that the excess material is not visible and does not seep into the exterior portion of the core 104 that contacts the media wound on the reel 100.

The heated plastic of the bonding material 124 also melts the immediately adjacent plastic material of the flange 108 and the core 104. The melted bonding material 124 mixes with the melted material of the flange 108 and core 104, causing partial mixture of the interfaces between the bonding material 124, flange 108, and core 104. When the magnetic field is deactivated, the melted bonding material 124, flange material, and core material harden such that all three materials are fused together around the susceptor material to form the bonded joint 116. Thus, the bonded joint 116 includes the material of the core 104 and the material of the flange 108, with the ferrous-impregnated susceptor and resin material of the bonding material 124 interposed between and interfacing with both the core 104 and flange 108.

Because the material of the flange 108 and core 104 is fused together by the bonded joint 116, a particularly strong connection is formed between the flange 108 and core 104. Moreover, the displacement of the bonding material 124 along the wall or walls of the channel 156 results in the fused material being present along at least two surfaces of each of the annular channel 156 (i.e. the base 168 and the inner wall 160) and the core 104 (i.e. at the end surface and the inner circumferential surface thereof), further strengthening the bonded joint 116.

In some embodiments, the tolerances between the core 104 and the walls 160, 164 of the annular channel 156 are 1/16 inch or less, and in particular 1/32 inch or less, and more particularly 0.0015 inches or less. The tight tolerances reduce the quantity of bonding material 124 necessary to produce the bonded joint 116, thereby reducing the overall manufacturing cost of the reel 100. Additionally, the chamfered edges 172, 176 of the annular channel 156, along with the slight angle of the inner and outer walls 160, 164 help guide the core 104 into the annular channel 156 to facilitate assembly of the reel 100 even with the tight tolerances therebetween.

The locating notches 184 and associated protrusions 204 facilitate precise placement of the bonding material 124 in the annular channel 156. In particular, the bonding material 124, along with the locating notches 184 and associated protrusions 204, can be configured differently in specific embodiments to precisely specify the locations of the bonding material 124 within the annular channel 156, while also simplifying installation of the bonding material 124 into the channel 156. Additionally, in some embodiments, one or more of the standoff tabs 188 may be configured to form a closeout rib or wall to prevent bonding material 124 from entering certain portions of the channel 156.

In one or more embodiments, the bonding material 124 may be formed integrally with either the core 104 or the flange 108 in a two-shot injection molding process. More specifically, when forming the flange 108 as an injection molded part, a first shot of the injection molding is performed to shape the flange 108 and its associated features. In a second shot of the injection molding, the bonding material 124 is molded to the base 168 and/or walls 160, 164 of the annular channel 156. Alternatively, the core 104 and its associated features is formed in a first shot of injection molding, while, in a second shot, the bonding material 124 is molded to one or both ends of the core 104.

Figure 8:
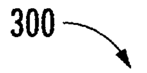
FIG. 8 is a process diagram of a method for producing a reel such as the reel of FIG. 1.
Figure 8:
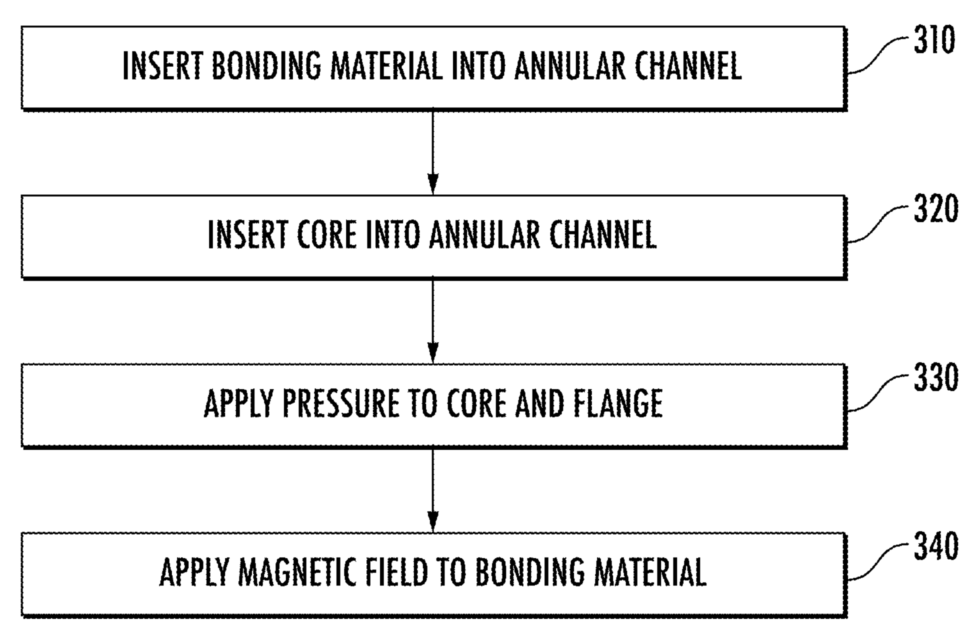

FIG. 8 depicts a process diagram of a method 300 for producing a bonded joint of a flexible media reel such as the bonded joint 116 or 120 described above. The method 300 begins with insertion of the bonding material 124 into the annular channel 156 (block 310). For example, the ring 200 of bonded material 124 is inserted into the annular channel 156 in such a way that the protrusions 204 are aligned with the locating notches 184. Alternatively, if the bonding material 124 is formed in multiple ring segments, the ring segments are inserted into the channel 156 so that the various ring segments and their associated protrusions are arranged in the corresponding locating notches. In other embodiments, the bonding material 124 may be injection molded into the channel 156 in a two-shot injection molding process, the bonding material 124 may be inserted into the channel 156 as a cord, the bonding material 124 may be extruded directly into the channel 156 using an extruder (e.g. a 3D printer), or the bonding material 124 may be inserted into the channel 156 as part of the core 104 after being molded onto the core 104 in a two-shot injection molding process.

The method 300 proceeds with inserting the core 104 into the annular channel 156 (block 320). In particular, the end of the core 104 is guided into the annular channel 156 by the chamfered edges 172, 176 such that slight misalignment or warping of the core 104 and/or annular channel 156 is easily remedied. Additionally, the end of the core 104 is further guided into its desired position by the tapered angle of the inner and outer walls 160, 164 until the core 104 rests against the bonding material 124.

Figures 9, 10:
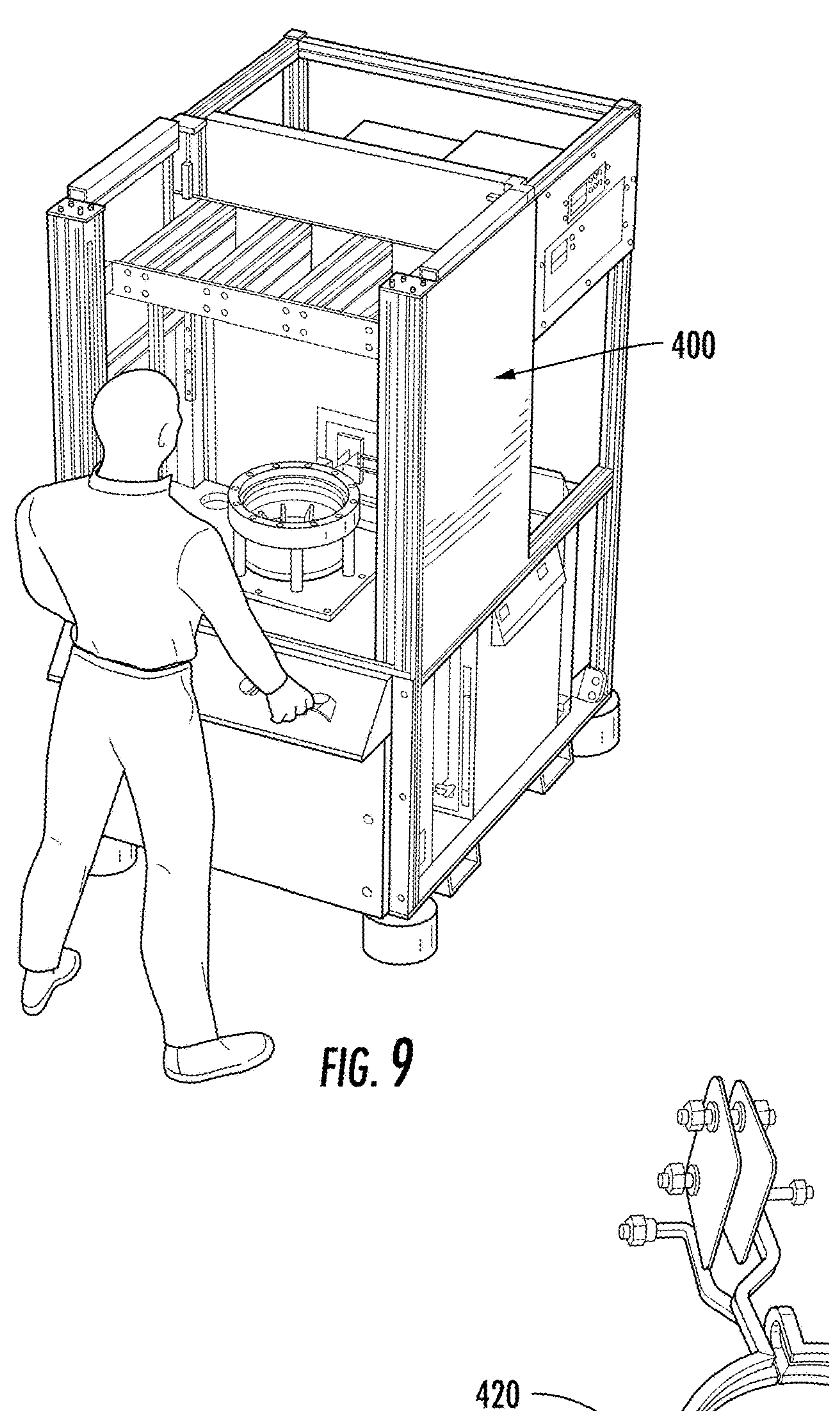
FIG. 9 is a schematic view of a ferrous induction machine used in the method of FIG. 8.
FIG. 10 is a perspective view of a ferrous induction coil of the ferrous induction machine of FIG. 9.

Next, pressure is applied to press the core 104 and flange 108 together (block 330). The pressure may be applied by a hydraulic press or a weight arrangement configured as part of the ferrous induction machine 400 (FIG. 9). Specifically, the machine 400 is designed to apply a constant pressure to the core 104 and flange 108 to facilitate the controlled flow of the melted bonding material 124 along the inner wall 160 of the channel 156.

Finally, the method 300 of FIG. 8 concludes by applying a magnetic field to the bonding material 124 (block 340) during the application of the pressure. The machine 400 of FIG. 9 includes one or more induction coils 420 (FIG. 10) that are configured to generate a magnetic field when electrical current is applied to the induction coils 420. The magnetic field excites the ferrous particles in the bonding material 124, melting the bonding material 124 and the adjacent material of the core 104 and flange 108 so that the material of the core 104 and the flange 108 fuse with the bonding material 124 to form a bonded connection between the flange 108 and the core 104. The method 300 can then be repeated for the opposite end of the core 104 and the opposite flange 112.

The reader should appreciate that, while the method 300 is described in a particular order herein for clarity, the steps 310, 320, 330, 340 may be performed in a different order than the order described herein and illustrated in FIG. 8. For example, the application of pressure (block 330) and the application of the bonding material (block 340) may be performed in reverse order, or these steps may be performed simultaneously. Additionally, for example, the bonding material 124 and the core 104 may be inserted into the annular channel 156 (blocks 310 and 320) simultaneously or in the opposite order described above and depicted in FIG. 8.

Additionally, in some embodiments, one or more parts of the method 300 are completed in an automated system. For example, one or more robotic components may be configured to insert the bonding material into the channel (e.g. a robotic arm placing the ring(s) of bonding material or a robotic extruder extruding the bonding material directly into the channel), align and insert the core into the annular channel (via, for example, one or more robotic arms), apply pressure to the core and flange, and/or activate the induction coils to generate the magnetic field.

Figure 11:
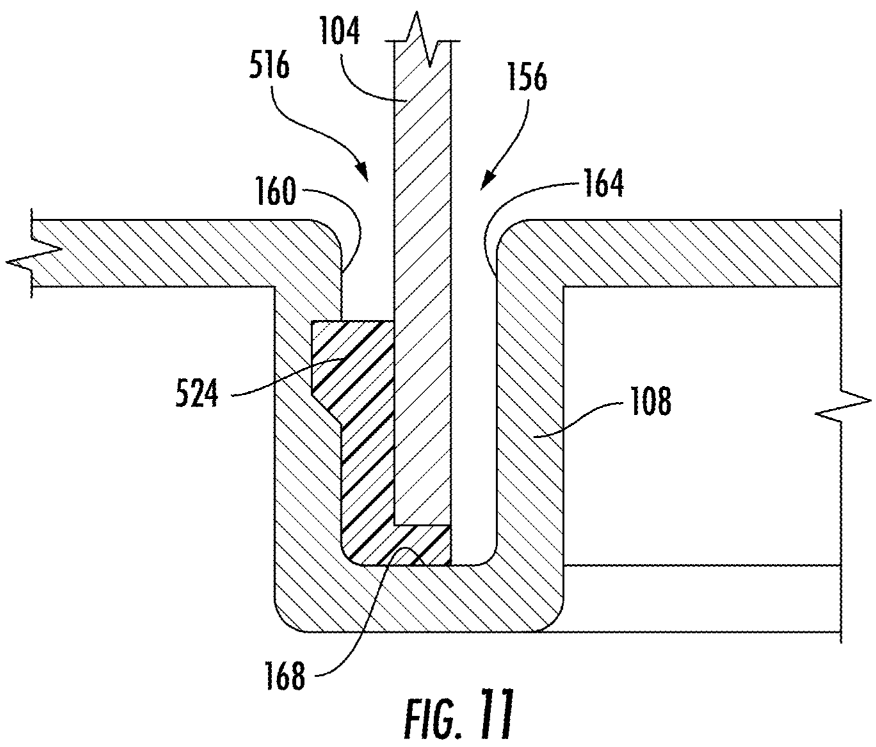
FIG. 11 is a detail side cross-sectional view of another bonded joint between the end of the core and the flange of the reel of FIG. 1.
Figure 12:
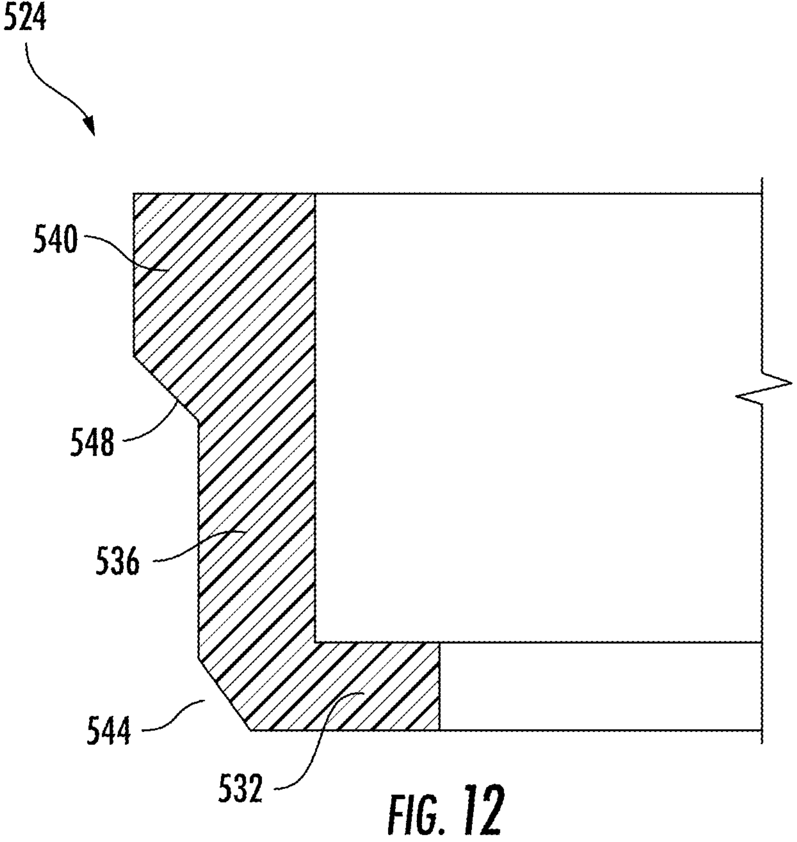
FIG. 12 is a detail cross-sectional view of the bonding material of the bonded joint of FIG. 11.

FIGS. 11 and 12 depict another embodiment of a bonded joint 516 connecting the core 104 and flange 108 in the annular channel 156 of the flange 108. In the embodiment of FIGS. 11 and 12, the bonding material 524 is shaped as a ring, ring segment, or plurality of ring segments with the cross-sectional shape seen best in FIG. 12. The bonding material 524 has a base portion 532 interposed between the end of the core 104 and the base surface 168 of the annular channel 156, a first axial portion 536 adjacent to the base portion 532 and interposed between the inner surface of the core 104 and the inner wall 160 of the annular channel 156, and a second axial portion 540 at the outer end of the bonding material 524 and that has a greater radial thickness than the first axial portion 536.

In particular, in an uninstalled state, the second axial portion 540 has a radial thickness that is greater than the distance between the inner wall 160 and the inner diameter of the core 104. Thus, when the bonding material 524 is installed in the channel 156 with the core 104, the second radial portion 540 forms an interference fit between the inner wall 160 and the core 104 such that the bonding material 524 exerts radial force on both the core 104 and the inner wall 160. In some embodiments, the first radial portion 536 has a thickness that is approximately equal to or slightly greater than the distance between the inner wall 160 and the core 104 such that the first radial portion 536 fits tightly between the inner wall 160 and the core 104, or the first radial portion also forms an interference fit between the inner wall 160 and the core 104.

In addition, the cross-section of the bonding material 524 includes two lead-in portions 544, 548 between the base portion 532 and the first radial portion 536, and between the first and second radial portions 536, 540. The two lead-in portions 544, 548 are angled relative to the axial direction 136 by, for example, between 20 and 40 degrees, and in one embodiment by approximately 30 degrees. The lead-in portions 544, 548 are designed to facilitate installation of the bonding material 524 into the channel 156 despite the bonding material 524 having a smaller inner diameter than the diameter of the inner wall 160.

The embodiment of FIGS. 11 and 12 may be used in the method of FIG. 8, but it is also particularly advantageous for bonding both flanges 108, 112 to the core 104 in a single process. Specifically, in such an arrangement, the core 104 and bonding material 524 are first installed into the annular channel 156 of both flanges 108, 112. The bonding material 524 may be fitted onto both ends of the core 104, which is then inserted into the annular channel 156, or the bonding material 524 may be inserted into the annular channel 156 first, and the core then subsequently inserted into the annular channel 156 and the opening inside the bonding material 524. Axial pressure is then applied to press the flanges 108, 112 together until the flanges 108, 112 are a prespecified axial distance from one another, and the axial pressure is then reduced or ceased. The prespecified axial distance between the flanges 108, 112 may be maintained by, for example, a fixture or tooling that disables further axial movement of the flanges 108, 112 relative to one another.

A magnetic field is then applied to both ends of the reel 100 simultaneously to heat the bonding materials 524 in the channels 156 of both flanges 108, 112. Due to the radial interference fit of the bonding material 524 between the inner wall 160 of the channel 156 and the inner surface of the core 104, the bonding material 524 exerts outward radial pressure on the channel 156 and on the core 104, which facilitates the bonding of the bonding material 524 to the core 104 and the flange 108 during the inductive hearing thereof while reducing or eliminating the need for axial pressure that could move the flanges 108, 112 from the prespecified spacing relative to one another. As a result, both flanges 108, 112 are bonded to the core 104 with a precise prespecified axial distance separating the flanges 108, 112. Moreover, both flanges 108, 112 can be connected to the core 108 a single bonding process, which reduces manufacturing time.

Figure 13:
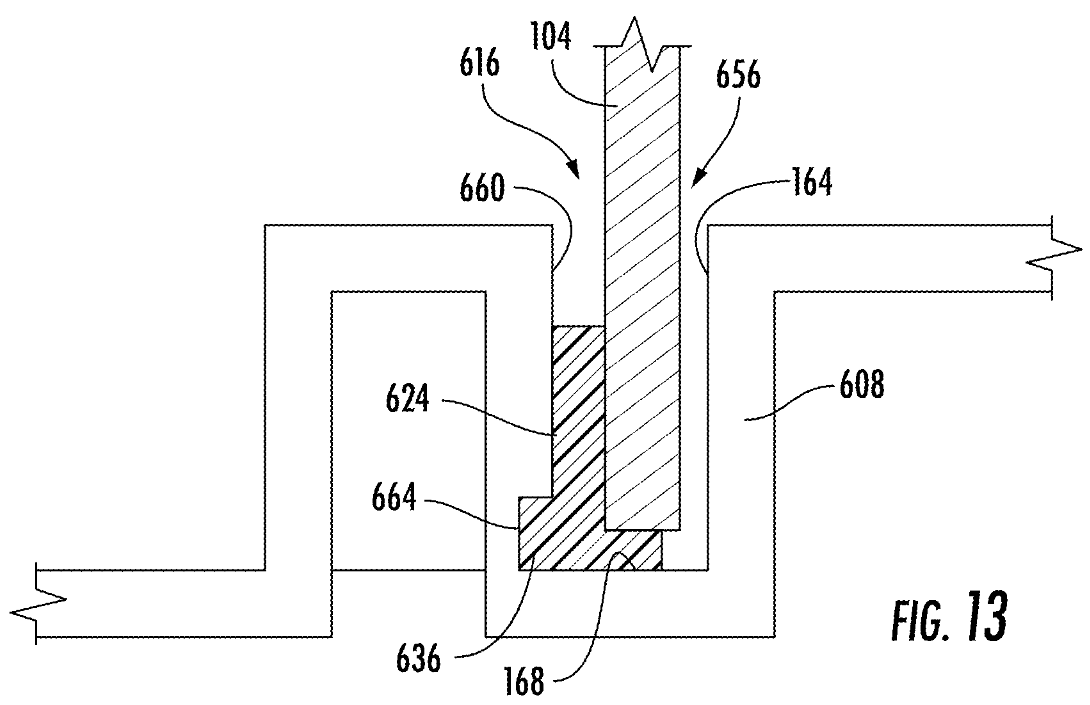
FIG. 13 is a detail side cross-sectional view of another bonded joint between the end of the core and the flange of the reel of FIG. 1.
Figure 14:
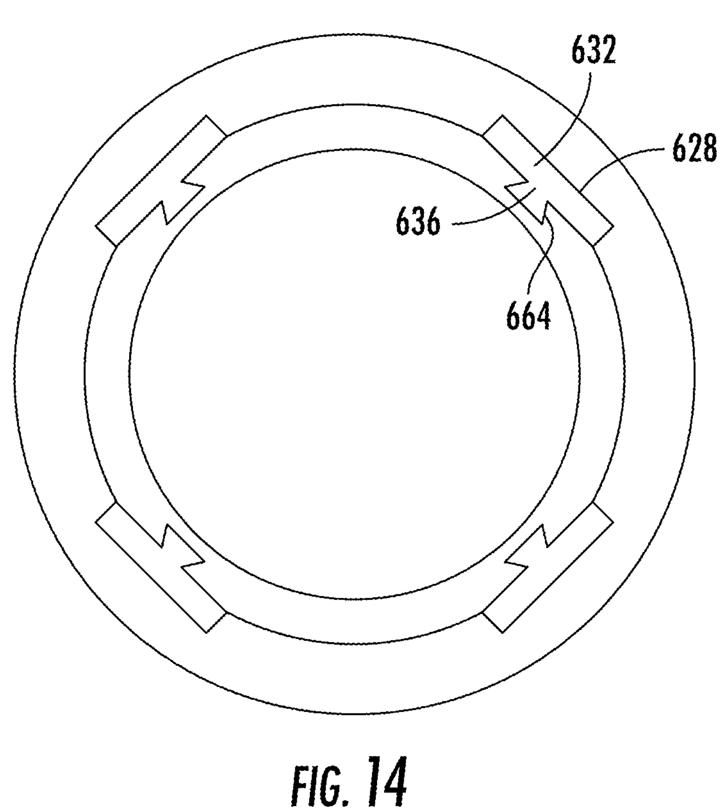
FIG. 14 is a top view of the core nest region and the bonding parts of the bonded joint of FIG. 13.
Figure 15:
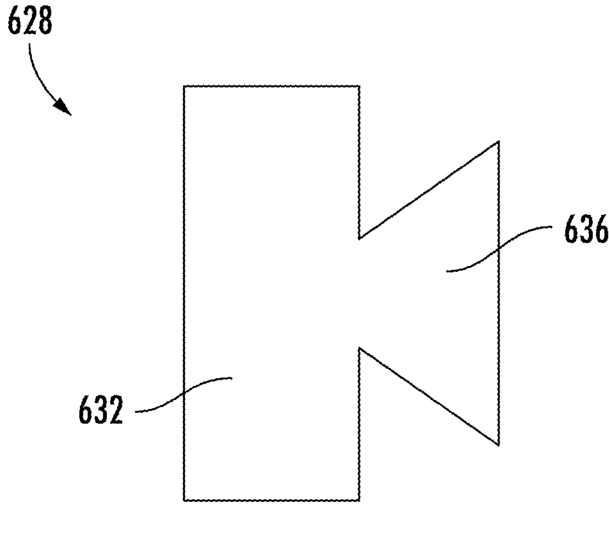
FIG. 15 is a top view of a bonding part of the bonded joint of FIG. 13.

Another embodiment of a bonded joint 616 between the core 104 and a flange 608 is depicted in FIGS. 13-15. In the embodiment of FIGS. 13-15, a plurality of wedge-shaped cutouts 664 are defined in the inner wall 660 of the annular channel 656. The bonding material 624 is formed as a plurality of bonding parts 628, each of which includes a block portion 632 and a wedge-shaped portion 636. The wedge-shaped portions 636 slide into corresponding wedge-shaped cutouts 664 with a radial interference fit such that the bonding parts 628 exert radial pressure on the core 104 once the core 104 is inserted into the channel 656. The core 104 and flange 608 can be bonded with axial pressure applied in addition to the radial pressure to facilitate a strong bond. Alternatively, similar to the embodiment of FIGS. 11 and 12 discussed above, the core 104 and both flanges 608 may be bonded simultaneously without need for axial pressure since the bonding parts 628 provide the radial pressure necessary for the bonding process. In some embodiments, the bonding part 628 is partially formed of thermoplastic elastomer (TPE) to increase the bending elasticity of the bonding part 628 to enable the bonding part 628 to bend for insertion into the arcuate channel 656. For example, in one embodiment, the bonding part 628 is formed of a combination of polypropylene, TPE, and iron powder.

The bonding parts 628 of FIGS. 13-15 can be used in reel assemblies having a variety of core diameters and core nest shapes. In particular, the number and location of the bonding parts 628 can be selected as desired based on the diameter of the core nest and core and the desired bond strength. For instance, reels with relatively small core diameters use less of the bonding parts, while reels with a larger diameter core use more of the bonding parts spaced around the circumference of the core.

Figure 16:
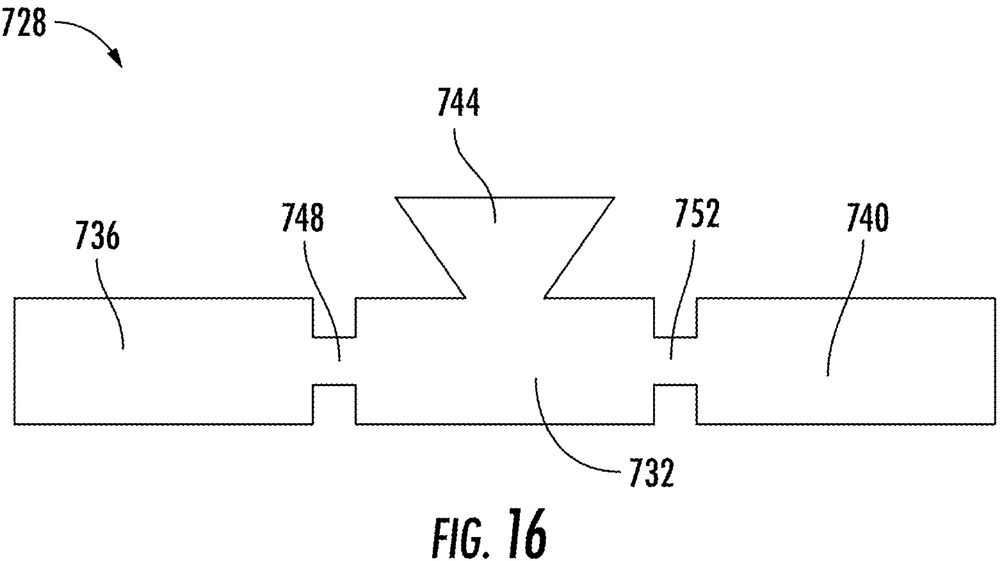
FIG. 16 is a top view of another bonding part of the bonded joint of FIG. 13.

FIG. 16 depicts another bonding part 728 that can be used in place of the bonding part 628 in the embodiment of FIGS. 13-15. The bonding part 728 includes a plurality of block members 732, 736, 740. The central block member 736 is connected to a wedge-shaped portion 744 in a similar manner as described above. In addition, between each of the block members 732, 736 and 736, 740, a narrowed portion 748, 752 connects the block members 732, 736, 740 together. In particular, the narrowed portions 748, 752 may be formed by relief cuts. The narrowed portions 748, 752 allow the block members 732, 736, 740 to bend relative to one another to enable the block members 732, 736, 740 to be fitted into the arcuate channel 656.

Figure 17:
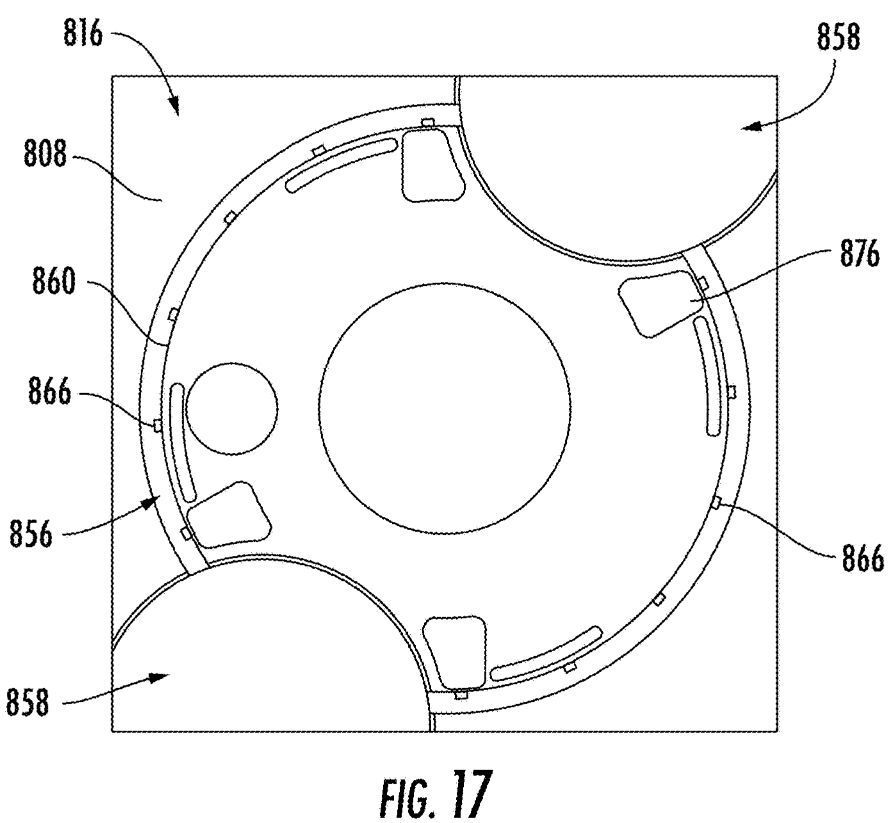
FIG. 17 is a top view of a core nest region of another flange of the reel of FIG. 1 having wedge-shaped ribs arranged in the annular channel.
Figure 18:
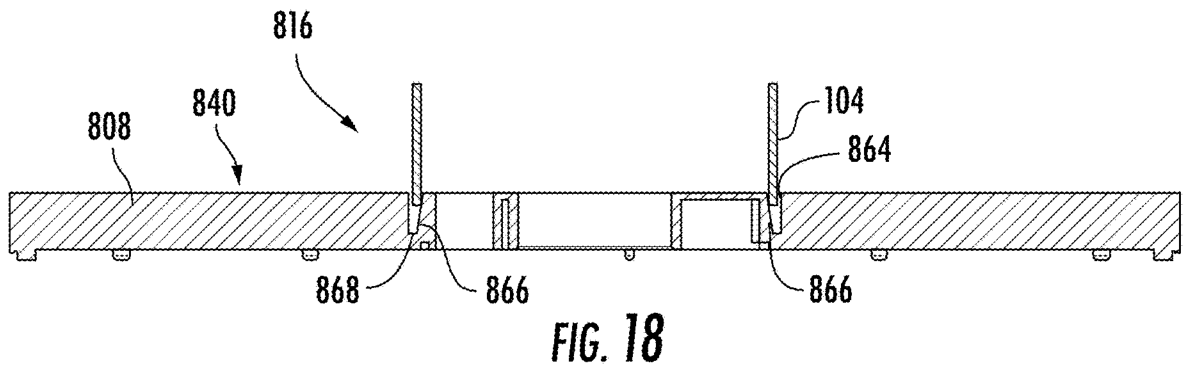
FIG. 18 is a side cross-sectional view of the flange and the core nest region of FIG. 17 showing the core partially inserted into the annular channel.
Figure 19:
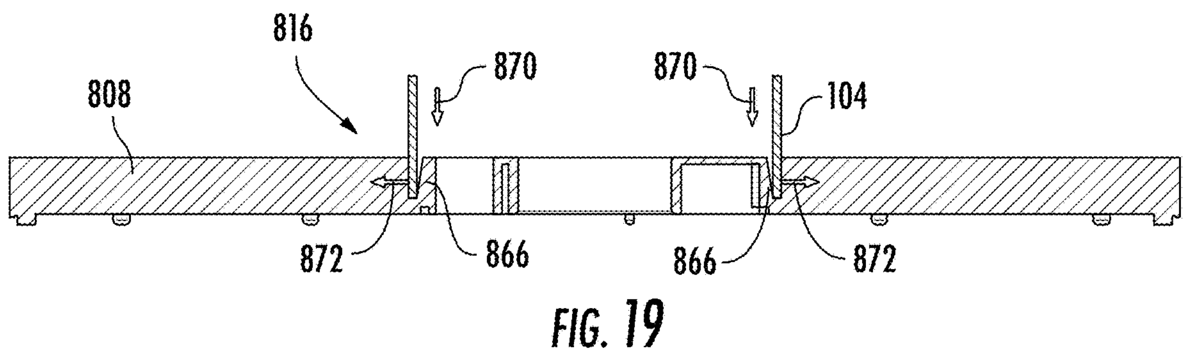
FIG. 19 is a side cross-sectional view of the flange and the core nest region of FIG. 17 showing the core inserted into the annular channel and the forces exerted by the wedge-shaped ribs.

FIGS. 17-19 depict a core nest region 848 of another flange 808 bonded via bonded joint 816 to the core 104. The flange 808 of FIGS. 17-19 defines an annular channel 856 that is interrupted by two circular openings 858 configured to facilitate an automatic media winding machine. The annular channel 856 further includes a plurality of wedge-shaped ribs 866 arranged in the annular channel 856. In particular, the wedge-shaped ribs 866 protrude from the inner wall 860 of the annular channel 856 toward the outer wall 864, beginning from the inner side 840 of the flange 808 such that the thickest radial portion of the rib 866 is at the base 868 of the channel 856. The wedge-shaped ribs 866 are configured such that, as the core 104 is inserted into the annular channel 856, the wedge-shaped ribs 866 cause the axial insertion force 870 to produce a radially outward force component 872 acting on the core 104.

As a result, the end of the core 104 is urged against the outer wall 864 of the annular channel 856. If there is a gap between the core 104 and the walls 860, 864 of the annular channel 856 due to manufacturing tolerances, such a gap is therefore greater on the inside of the core 104 than outside the core 104. Thus, when the bonding material is melted and flowable in the annular channel 856, any excess boding material flows to the inside of the core 104, away from the exterior of the core 104 where the wound media is present.

Moreover, because the core 104 is urged toward the outer wall 864 of the annular channel 856, the gap between the annular channel 856 and the outside of the core 104 is reduced. As a result, there is less of a potential for the wound material to be pinched between the core 104 and the annular channel 856.

The bonded joint 816 may include any desired number of wedge-shaped ribs 866. For example, the embodiment of FIG. 17 includes 12 wedge-shaped ribs 866 spaced evenly around the annular channel 856. In other embodiments, particularly in embodiments in which only portions of the annular channel 856 are filled with bonding material, the annular channel 856 may have fewer wedge-shaped ribs 866 (see, e.g., FIGS. 20 and 21). In particular, in some embodiments, the wedge-shaped ribs 866 may be present only at the locations at which the bonding material is inserted in the annular channel 856. Further, in some embodiments, the wedge-shaped ribs 866 may be positioned at the circumferential location of other features of the flange 808, for example at the location of stacking features 876, such that the other features provide added radial strength to the wedge-shaped ribs 866.

Figure 20:
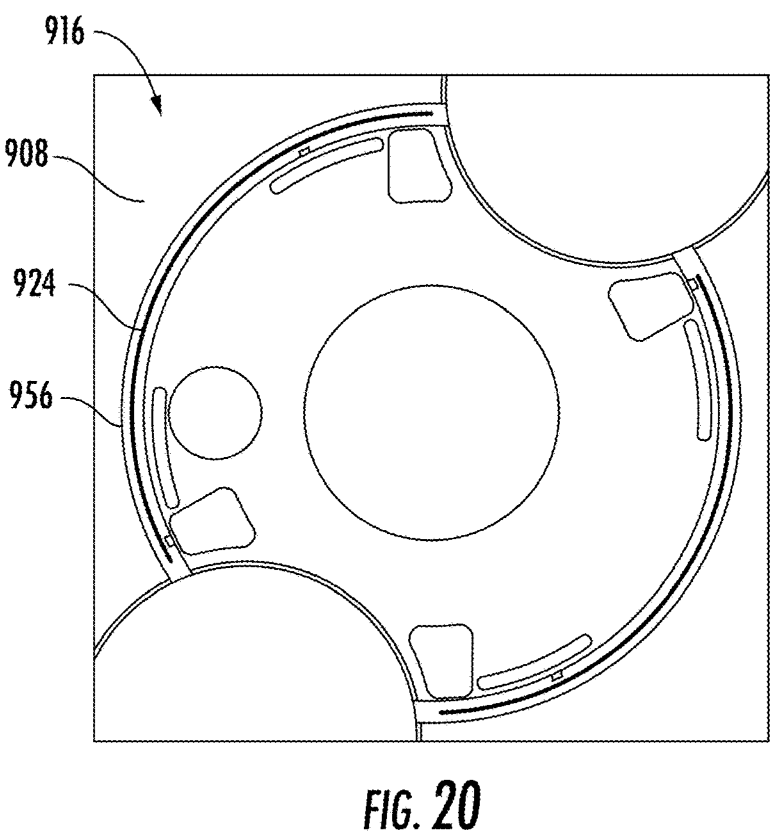
FIG. 20 is a top view of the core nest region of the reel of FIG. 1 in which the susceptor material is formed as two wire portions.
Figure 21:
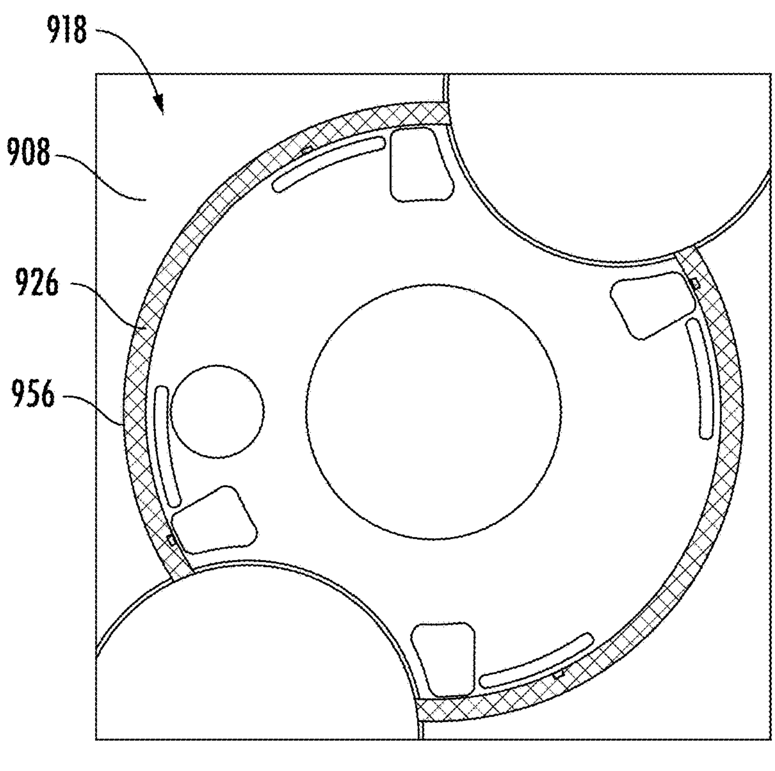
FIG. 21 is a top view of the core nest region of the reel of FIG. 1 in which the susceptor material is formed as two wire mesh regions.

FIGS. 20 and 21 illustrate two additional embodiments of bonded joints 916, 918, respectively, in which the bonding material 924, 926 is a susceptor material inserted into the annular channel 956 without a resin carrier. Specifically, in the embodiment of FIG. 20, the bonding material 924 is one or more bare ferrous wires that extends along some or all of the circumferential length of the annular channel 956. In the embodiment of FIG. 21, the bonding material 926 is a wire mesh, for example a ferrous wire screen, wire cloth, or other pliable thin ferrous sheet material.

The embodiments of FIGS. 20 and 21 are formed in essentially the same manner as described in the process 300 illustrated in FIG. 8. The bonding material 924, 926 is inserted into the annular channel 956 until it rests on the base of the annular channel 956. The wire or mesh bonding material 924, 926 may be inserted independently of the core 104, or it may be pressed into the annular channel 956 by the core 104 as the core 104 is inserted into the annular channel 956. In another embodiment, the bonding material 924, 926 may be formed integrally with the flange 908 or the core 104 during formation of the flange 908 or core 104 by, for example, embedding the wires or mesh in the flange 908 or core 104 during injection molding thereof.

Once the core 104 is inserted into the annular channel 956 and pressure is applied to urge the core 104 and flange 908 together, the magnetic field is applied to the bonding material 924, 926. Application of the magnetic field to the bonding material 924, 926 causes the metal of the wire or mesh bonding material to increase in temperature, which melts the material of the core 104 and the material of the flange 908 in the annular channel 956. The melted core and flange material mixes and, when the magnetic field is removed, the core and flange material solidify, resulting in the core 104 and flange 908 being fused together around the bonding material 924, 926.

As noted above, in the embodiment of FIGS. 20 and 21, the bonding material 924, 926 does not include a resin binding material. As a result, the embodiment of FIGS. 20 and 21 requires less material in the bonding joint 916, 918. Moreover, with no resin, the tolerances between the core 104 and the flange 908 can be reduced.

Further, in the case of the wire mesh of FIG. 21, when inserted into the annular channel 956, the wire mesh bonding material 926 may wrap partially around the end surface of the core 104, thereby allowing the bonding material 926 to encompass portions of the inner and outer side surfaces of the core 104. As a result, the bonded joint 918 fuses three sides of the material of the core 104 and flange 908 together, thereby producing a strong bond therebetween.

In addition to the advantages described above, the bonded joints 116, 120, 516, 616, 816, 916, 918 disclosed herein provide for several improvements over conventional reel assemblies. First, in conventional reel assemblies, the flanges are connected to the core by bolts, which necessitates using a high strength material, usually paper fiber, in the core to obtain sufficient strength for the bolted connection. The fibers from the paper, however, may shed from the core and cause damage to the flexible media on the reel, particularly to wires or cables. Moreover, the paper fibers can cause problems with sensitive equipment, particularly when used in sterile environments such as, for example, server rooms.

In contrast, the bonded joints 116, 120, 516, 616, 816, 916, 918 according to the present disclosure require no bolts, and can therefore be made almost entirely from plastic, with the susceptor material being the only impurity. As a result, the reel 100 does not have any paper fibers that can cause problems with the wire or other media. Moreover, because the reel 100 is formed substantially entirely of plastic, there is no material that could cause contamination when used in sterile environments.

Additionally, since the core 104 and flanges 108, 112, 608, 808, 908 can be formed entirely of plastic, and the bonded joints 116, 120 are formed of plastic with only a small amount of susceptor material, e.g. powdered metal, mesh, or wire, the reel 100 is generally recyclable without the need for disassembling any of its components.

It will be appreciated that the above-described embodiments are merely illustrative, and that those of ordinary skill in the art may readily devise their own modifications and implementations that incorporate the principles of the present invention and fall within the spirit and scope thereof.

The invention claimed is:

1. A reel comprising:

a core;

a first flange affixed to a first end of the core;

a second flange affixed to a second opposite end of the core; and a first bonded joint connecting the first flange to the core, the first bonded joint including a first susceptor material arranged between the first flange and the first end of the core, wherein the first flange and the first end of the core are bonded around the first susceptor material;

wherein the first flange comprises a core nest region defining an annular channel in which the first end of the core is connected to the first flange via the first bonded joint; and further comprising a plurality of stand-off tabs extending between a base surface of the annular channel and the first end of the core to define an axial distance between at least a portion of the first end of the core and the base surface of the annular channel.

2. The reel of claim 1, wherein:

the first bonded joint further comprises a resin material in which the first susceptor material is embedded, and the resin material is materially bonded to a first material of the core and to a second material of the first flange.

3. The reel of claim 1, wherein the first susceptor material is arranged at least partially between a base of the annular channel and the first end of the core.

4. The reel of claim 3, wherein the first susceptor material is partially interposed between an inner wall of the annular channel and an inner radial surface of the core.

5. The reel of claim 4, wherein a first distance between an outer wall of the annular channel and an outer radial surface of the core is less than a second distance between an inner wall of the annular channel and an inner radial surface of the core.

6. The reel of claim 4, wherein the first susceptor material further comprises a first portion arranged between an end surface of the core and a base surface of the annular channel, a second portion interposed between an inner side surface of the core and an inner wall of the annular channel, and a third portion interposed between the inner side surface of the core and the inner wall of the annular channel, the second portion being interposed axially between the first and third portions and the second portion having a smaller radial thickness than the third portion.

7. The reel of claim 4, wherein the first flange further comprises a plurality of wedge-shaped portions protruding outwardly from an inner wall of the annular channel, the wedge-shaped portions configured to urge the first end of the core radially outwardly toward an outer wall of the annular channel.

8. The reel of claim 1, wherein a first material of the core is materially bonded to a second material of the first flange at the first susceptor material.

9. The reel of claim 8, wherein the first susceptor material comprises at least one wire arranged in the annular channel and around which the first flange and the first end of the core are bonded to one another.

10. The reel of claim 8, wherein the first susceptor material comprises a wire mesh arranged in the annular channel and around which the first flange and the first end of the core are bonded to one another.

11. The reel of claim 1, wherein the first flange includes a plurality of wedge-shaped cutouts defined into an inner wall of the annular channel, and the first susceptor material is arranged partially in the plurality of wedge-shaped cutouts.

12. The reel of claim 1, further comprising:

a second bonded joint connecting the second flange to the second end of the core, the second bonded joint including a second susceptor arranged between the second flange and the second end of the core, wherein the second flange and the second end of the core are bonded around the second susceptor material.

13. The reel of claim 1, wherein the stand-off tabs are formed on the base surface of the annular channel.

14. A reel comprising:

a core;

a first flange affixed to a first end of the core;

a second flange affixed to a second opposite end of the core; and a first bonded joint connecting the first flange to the core, the first bonded joint including a first susceptor material arranged between the first flange and the first end of the core, wherein the first flange and the first end of the core are bonded around the first susceptor material;

wherein the first flange comprises a core nest region defining an annular channel in which the first end of the core is connected to the first flange via the first bonded joint; and wherein the first flange defines a plurality of notches extending radially from the annular channel and in which the first susceptor material is partially arranged.

15. A method of producing a reel comprising:

interposing a first susceptor material between a first flange and a first end of a core of the reel; and applying a magnetic field to the first susceptor material so as to excite the first susceptor material and increase a temperature of the first susceptor material, forming a first bonded joint around the first susceptor at which the first flange is bonded to the first end of the core;

applying pressure urging the core and the first flange together while applying the magnetic field;

wherein the interposing of the first susceptor material includes inserting the first susceptor material and the first end of the core in an annular channel defined in the first flange;

wherein the first susceptor material is embedded in a bonding material that includes plastic;

wherein applying the magnetic field to the first susceptor material increases the temperature of the first susceptor material sufficiently to liquefy at least a portion of the plastic of the bonding material to form a liquefied portion; and wherein applying the pressure urging the core and the first flange together while applying the magnetic field displaces at least some of the liquefied portion such that the at least some of liquefied portion moves along at least one side wall of the core in the annular channel.

16. The method of claim 15, further comprising:

interposing a second susceptor material between a second flange and a second opposite end of the core; and applying the magnetic field to the second susceptor material so as to excite the second susceptor material and increase a temperature of the second susceptor material forming a second bonded joint around the second susceptor material at which the second flange is bonded to the second end of the core.

17. The method of claim 16, wherein the applying of the magnetic field to the first susceptor material and the applying of the magnetic field to the second susceptor material occur at least partially simultaneously.

18. The method of claim 17, further comprising:

applying axial pressure to the first and second flanges during the application of the magnetic field to the first and second susceptor materials to urge the first and second flanges toward one another.

* * * * *